June 4, 1968  J. E. STROBERG  3,386,555

POWERED CASE SHIFT HAVING OVERCENTER SPRING

Filed Dec. 19, 1966  2 Sheets-Sheet 1

INVENTOR.
JOHN EMIL STRÖBERG
BY Darby + Darby
ATTORNEYS

INVENTOR.
JOHN EMIL STROBERG
BY Darby + Darby
ATTORNEYS

United States Patent Office 3,386,555
Patented June 4, 1968

3,386,555
POWERED CASE SHIFT HAVING OVERCENTER SPRING
John Emil Stroberg, Svangsta, Sweden, assignor to Facit-Halda AB, Svangsta, Sweden, a Swedish joint-stock company
Filed Dec. 19, 1966, Ser. No. 602,976
Claims priority, application Sweden, Dec. 17, 1965, 16,369/65
2 Claims. (Cl. 197—74)

ABSTRACT OF THE DISCLOSURE

The within disclosure describes a simple and reliable mechanism for shifting the type basket of a typewriter from a lower to an upper case position, and vice versa, which mechanism is adapted to be used in a motor driven typewriter of the type having a toothed snatch roll normally used for actuating the type bars. The disclosure includes a mechanism which is particularly advantageous since it includes a simple, reliable over-center spring mechanism for reversing the position of a switch hook adapted to engage the snatch roll to initiate the shift, as well as a second overcenter spring mechanism for completing the shift movement initiated by the switch hook.

This invention relates to an arrangement, for example in electric typewriters, adapted to shift the writing from small (lower case) to capital (upper case) letters, and vice versa, of the type wherein the electromotor of the typewriter drives a toothed or snatch roll for actuating a shift hook which upon actuation of the shift key is caused to engage with the toothed roll of the typewriter.

The invention is characterized in that the shift hook is actuated in both directions by one and the same spring, which is accomplished in that a linkage cooperating with the shift hook during the displacement of the latter changes the direction and/or the position of the line of action of the spring in the manner required, and also by an arrangement, by means of which shifting motions of the carrying member for the type bars occur partly in a commencing phase and partly in a completing phase, in such a manner, that only the commencing phase is effected by the engagement of the shift hook with the toothed roll and the completing phase preferably is effected by a spring in cooperation with a snap means at the same time as the shift hook is released from its engagement with the toothed roll.

Shifting arrangements which are driven by the electromotor of the typewriter are known per se and widely utilized. A shifting arrangement of the said type is required to allow for a very quick shifting motion and a relatively quiet operation, which can be achieved in that the drive against the toothed roll ends before the shifting motion is completed, and a spring completes the motion.

The space along the toothed roll being extremely limited, it is important that the ararngement has small space requirements, particularly in lateral direction. For this reason it is desired to make use of a so-called shift hook which engages with a toothed roll driven by the electromotor of the typewriter for shifting from small to capital letters as well as vice versa. For rendering possible a simple construction, spring action is utilized upon an impulse to engagingly connect the shift hook with the toothed roll. This involves the difficulty of producing a simple and reliable spring means, by which the two tooth systems of the shift hook can be pressed into engagement with the toothed roll in both opposite positions, the said tooth systems being arranged substantially diametrically in relation to the toothed roll. In Swedish Patent Specification 203,891 an arrangement is shown in which the said spring problem is solved in a simple and reliable way. The arrangement has proved to operate very well, but it involves the disadvantage that two springs must operate against one another which gives rise to a balancing problem between the springs. This problem is solved by the arrangement according to the invention in employing only one spring and changing its direction of action.

An embodiment of the invention is described in a greater detail in the following, reference being had to the accompanying drawings.

Figure 1:
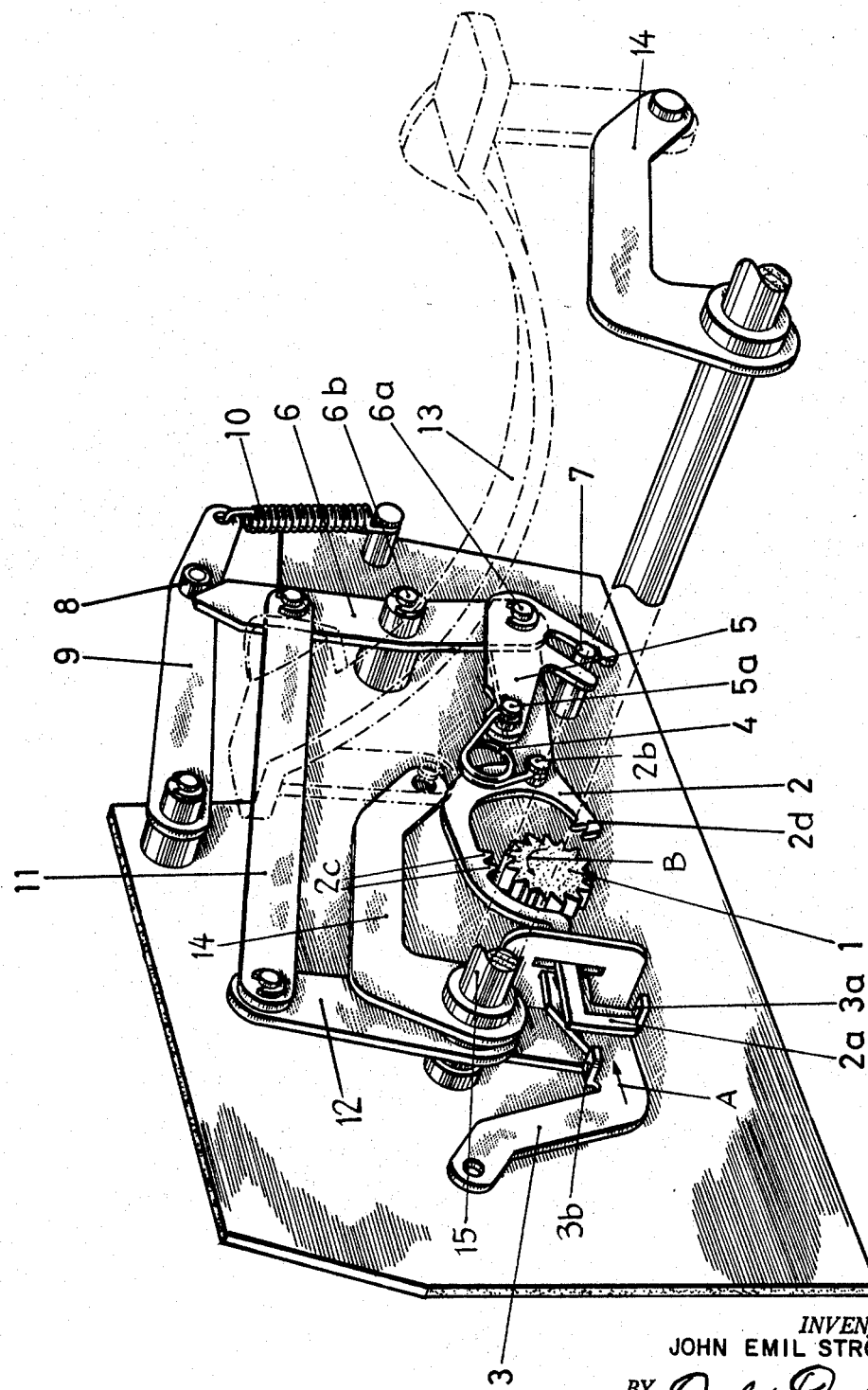
FIG. 1 is a perspective view of the mechanism in its starting position.

As appears from the figures, a shift hook 2 is mounted in a known manner to enclose the toothed roll 1 of the typewriter, which roll rotates continuously in the direction indicated by the arrow B in FIG. 1. The shift hook is provided with two tooth systems 2c and 2d adapted to be moved from the upper and lower side respectively into engagement with the toothed roll.

The shift hook 2 cooperates with a shift connector 3 which in its turn is actuated by the shift key (not shown).

The shift connector is provided with two stops 3a and 3b respectively which cooperate with a projection 2a on the shift hook 2.

The shift hook is pivoted on a pin 6a adjacent the lower end of a transfer lever 6 which is in turn pivoted at 6b on the typewriter frame. The upper end of lever 6 is bevelled on both sides, so that the lever when moving in either direction may actuate the roller 8 to lift the positioning arm 9 on which the roller 8 is fastened, said lifting being made against the action of the tension spring 10 which acts upon the outer end of the arm 9 the other end of which is secured in the typewriter frame. From the transfer lever 6 the motion is transferred through the link 11 to the transfer arm 12 mounted on the shift axle 15, on which also the shift arms 14 are fastened. At their outer ends the shift arms 14 are articulated with the bow 13 constituting the carrying member for the type bars.

An angular or bell crank lever 5 is pivotally mounted on pin 6a. One end of a hairpin spring 4 bears against a pin 2b on the shift hook 2, and the other end bears against pin 5a on one arm of the angular lever 5. The other arm of the angular lever 5 is provided with a radial slot embracing a pin 7 mounted in the typewriter frame.

Figure 2:
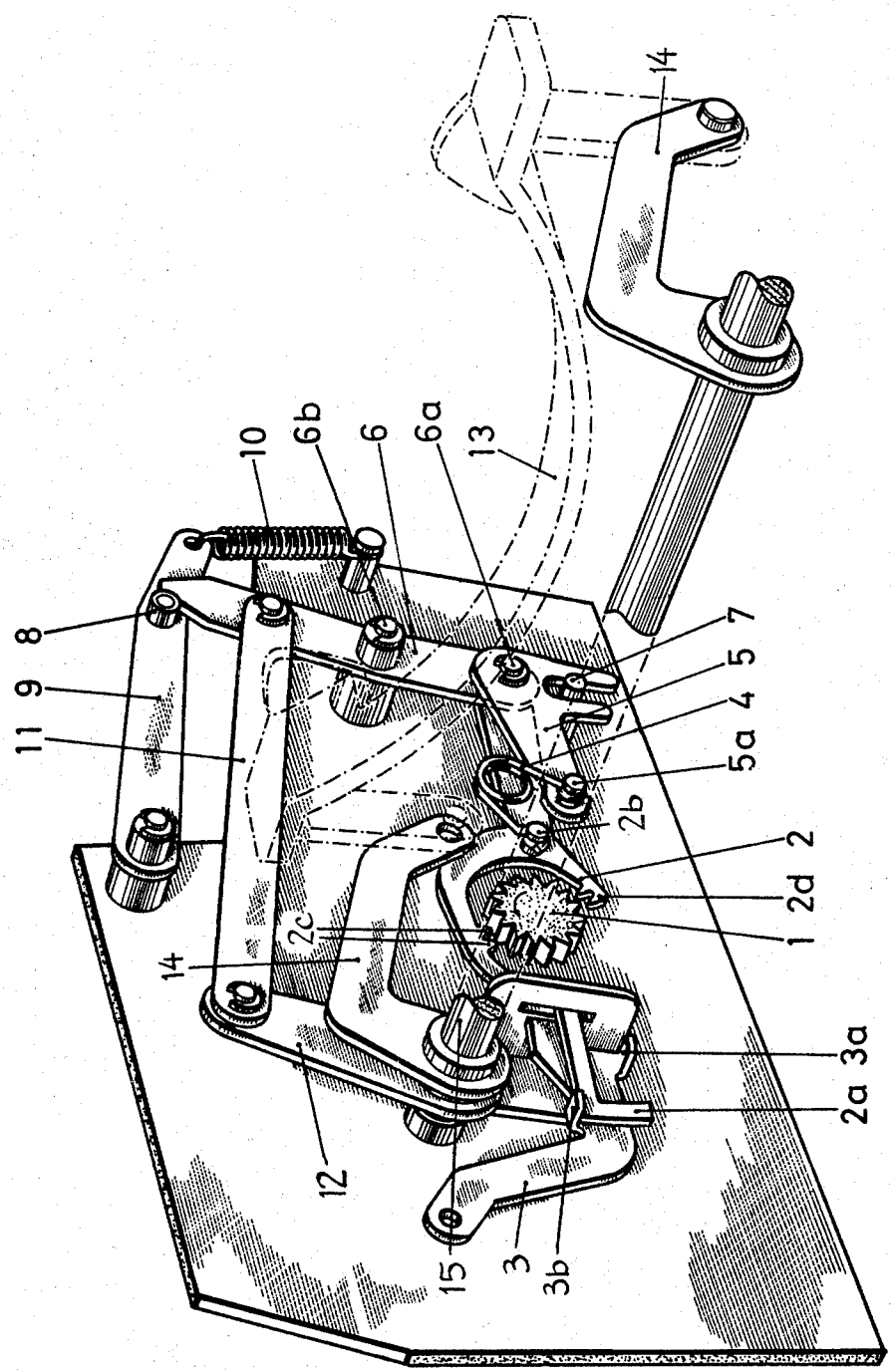
FIG. 2 is a similar perspective view of the mechanism showing the carrying member for the type bars in its lower position.

The arrangement operates as follows. Upon pressing the shift key the shift connector 3 is moved in the direction of the arrow A (FIG. 1), thereby moving the stop 3a out of the contact with the projection 2a on the shift hook. Thereby, the hairpin spring 4 causes the shift hook 2 to swing about pin 6a in a counterclockwise direction so that two teeth 2c on the shift hook are brought into engagement with the toothed roll 1 and the shift hook is then driven in the direction opposite to the arrow A by the snatch roll 1. The pin 6a is moved, thereby causing the angular lever 5 to pivot about pin 6a since its forked end is held by pin 7, so that the mounting point 5a of the hairpin spring 4 is given a lower position, which results in a change of the direction of action of the hairpin spring. The shift hook 2 is thereby driven in a clockwise direction such a distance that its teeth 2c disengage from the tooth roll 1, the motion being limited by stop 3b as shown in FIG. 2. At each motion of the shift hook 2 the lever 6 has imparted thereto a swinging motion about pivot 6b, and lever 6 via the roller 8 lifts the arm 9 against the action of the spring 10. The motion of the lever 6 is transferred through the link 11, the arm 12, the axle 15 and the shift arms 14 to the bow 13 whereby the roller 8 subsequent to its rolling over the V-shaped top of the lever 6 completes the motion of the system by pressing with the action of the spring 10 upon the other side of the lever 6, so that the bow 13 is moved down against a stop (not shown) and is retained in a lower position representing an upper case or capital letter.

For the shifting from a capital to a small letter the shift key is released to move upwards, whereby the shift connector 3 returns in a direction opposite to the arrow A. Thereby the shift hook 2 is released from the stop 3b (see FIG. 2), whereby the shift hook 2 is lifted upwards by the hairpin spring 4, so that the two teeth 2d on the shift hook are caused to engage with the tooth roll 1. The shift hook is thereby driven in the direction of the arrow A and takes the arm 6 along, whereby the roller 8 in like manner as described above completes the motion of the system in this direction by action of spring 10, so that the segment 13 is lifted upwards against a stop (not shown) and is retained in an upper position corresponding to the position for a small letter. At the same time the angular lever 5 has been swung by the pin 7, so that the mounting point 5a of the hairpin spring 4 is moved to an upper position. Hereby the hairpin spring 4 again actuates the shift hook 2 in the downward direction, so that the teeth 2d of the hook are released from the tooth wheel 1 when the lever 6 has moved such a distance that the roller 8 with a good margin has moved past the top of the lever 6. Thereafter the spring 10 completes the motion to the final position of the bow where it is stopped by a stop (not shown). In this position the downward swinging of the shift hook 2 is blocked by the stop 3a until a new impulse is received from the shift key.

The two tooth systems 2c, 2d of the shift hook are advantageously offset somewhat in the same direction as the rotary motion of the tooth roll 1, in relaion to a normal extending through the point of symmetry of the tooth systems to a line through this point and the centre of the pin 6a.

I claim:

1. In a motor driven typewriter having a frame, a type basket shiftable into two positions corresponding to lower and upper case letters, respectively, and a snatch roll continuously driven by a drive motor engageable to actuate the type bars of the type basket, in combination, a case shifting mechanism comprising, a shift hook, a shift motion transfer lever, means pivotally mounting said transfer lever on a fixed pivot in the frame, means pivotally mounting said shift hook at one end of said transfer lever, said shift hook being bifurcated and embracing the snatch roll, each bifurcation having teeth thereon adapted to engage the respectively opposite sides of the snatch roll, a bell crank lever pivotally mounted on said shift hook mounting, with one arm thereof extending parallel and adjacent to a portion of said shift hook and the other arm extending at an angle to said first arm, said other arm being slotted and embracing a pin fixed in the frame, a hairpin spring, means mounting said spring on said first arm of said bell crank and an adjacent point on said shift hook to urge said shift hook to rotate about said common pivot point in a direction opposite to that of said bell crank, and means under control of a shift key to release said shift hook, permitting said hairpin spring to rotate it about its pivot to engage said snatch roll to thereby cause said transfer lever to move about its pivot and rotate said bell crank lever to urge said shift hook in the opposite direction, said means under control of said shift key then arresting said hook before the teeth of said fork again engage the snatch roll.

2. A key shift mechanism as claimed in claim 1, wherein camming surfaces in the form of a V are provided at the end of said transfer lever opposite said shift hook pivot, a lever pivotally mounted on said frame, a roller on said lever, a spring urging said lever into position with said roller against said camming surfaces and means comprising an oscillatable shaft connecting said transfer lever to the type basket, said camming surfaces and spring cooperating to complete the motion of said transfer lever and type basket in either direction after initiation of motion by said shift hook.

References Cited
UNITED STATES PATENTS

| | | | |
|---|---|---|---|
| 824,579 | 6/1906 | Paul | 197—74 |
| 2,517,989 | 8/1950 | Dodge | 197—74 |
| 2,797,790 | 7/1957 | Bledgett | 197—74 |
| 2,818,151 | 12/1957 | Yeager | 197—17 |
| 3,017,979 | 1/1962 | Hoffman | 197—74 |
| 3,034,629 | 5/1962 | Link | 197—74 |
| 3,174,609 | 3/1965 | Frechette et al. | 197—74 X |

ROBERT E. PULFREY, *Primary Examiner.*

E. S. BURR, *Examiner.*